US012807242B2

(12) United States Patent
Matsumoto

(10) Patent No.: US 12,807,242 B2
(45) Date of Patent: Nov. 24, 2026

(54) VEHICLE SPAT DEVICE

(71) Applicant: AISIN CORPORATION, Kariya (JP)

(72) Inventor: Kazuya Matsumoto, Kariya (JP)

(73) Assignee: AISIN CORPORATION, Kariya (JP)

(*) Notice: Subject to any disclaimer, the term of this patent is extended or adjusted under 35 U.S.C. 154(b) by 328 days.

(21) Appl. No.: 18/598,032

(22) Filed: Mar. 7, 2024

(65) Prior Publication Data

US 2024/0308601 A1 Sep. 19, 2024

(30) Foreign Application Priority Data

Mar. 16, 2023 (JP) ................................ 2023-041700

(51) Int. Cl.
*B62D 35/00* (2006.01)
*B62D 35/02* (2006.01)

(52) U.S. Cl.
CPC ............ *B62D 35/005* (2013.01); *B62D 35/02* (2013.01)

(58) Field of Classification Search
CPC ...... B62D 35/005; B62D 35/00; B62D 35/02; B62D 37/02; B62D 35/007; B62D 35/008
USPC ....................................................... 296/181.5
See application file for complete search history.

(56) References Cited

U.S. PATENT DOCUMENTS

| | | | | |
|---|---|---|---|---|
| 10,351,182 | B2 * | 7/2019 | Zielinski | B62D 35/02 |
| 10,435,084 | B2 * | 10/2019 | Povinelli | B62D 35/02 |
| 2020/0164934 | A1 * | 5/2020 | Shiga | B62D 35/005 |
| 2021/0139088 | A1 * | 5/2021 | Tachi | B62D 35/005 |
| 2021/0206436 | A1 * | 7/2021 | Matthews | B62D 35/005 |

FOREIGN PATENT DOCUMENTS

JP 2019-93785 A 6/2019

* cited by examiner

*Primary Examiner* — Amy R Weisberg
*Assistant Examiner* — Philip C Adams
(74) *Attorney, Agent, or Firm* — Oblon, McClelland, Maier & Neustadt, L.L.P.

(57) ABSTRACT

A vehicle spat device includes a spat, a link mechanism, and a clutch mechanism. The spat is an aerodynamic member of a vehicle. The link mechanism can move the spat between a deployed position where the spat is arranged at a position closer to a front end of the vehicle than a wheel of the vehicle and a retracted position where the spat is retracted. The clutch mechanism restricts relative rotation of the spat around a clutch axis, and allows the relative rotation, based on external force input to the spat. The link mechanism includes a rotation shaft member and a movement shaft member. A line along an axis of the rotation shaft member is a rotation axis in movement of the spat between the deployed position and the retracted position. A line along an axis of the movement shaft member is the clutch axis.

4 Claims, 6 Drawing Sheets

VEHICLE SPAT DEVICE

CROSS REFERENCE TO RELATED APPLICATIONS

This application is based on and claims priority under 35 U.S.C. § 119 to Japanese Patent Application No. 2023-041700, filed on Mar. 16, 2023, the entire content of which is incorporated herein by reference.

TECHNICAL FIELD

This disclosure generally relates to a vehicle spat device.

BACKGROUND DISCUSSION

According to a known vehicle spat device, a spat as an aerodynamic member is arranged on a front side of a wheel, and thereby, a traveling wind to hit the wheel is rectified. Such a spat device can move the spat between a deployed position and a retracted position.

A vehicle rectification device disclosed in JP2019-93785A (Reference 1) includes a coupling mechanism as a configuration for suppressing a load applied to a spat from being transmitted to a drive device when external force acts on the spat arranged at a deployed position. Reference 1 describes the spat as a rectification member.

The vehicle rectification device disclosed in Reference 1 assumes a case where external force of moving the spat from the deployed position to the retracted position acts on the spat arranged at the deployed position. In the vehicle rectification device as disclosed in Reference 1, when external force acts on the spat arranged at the retracted position, a load applied to the spat cannot be alleviated in some cases.

A need thus exists for a vehicle spat device, which is not susceptible to the drawback mentioned above.

SUMMARY

A vehicle spat device according to an aspect of this disclosure includes a spat, a link mechanism, and a clutch mechanism. The spat is an aerodynamic member of a vehicle. The link mechanism can move the spat between a deployed position where the spat is arranged at a position closer to a front end of the vehicle than a wheel included in the vehicle and a retracted position where the spat is retracted. The clutch mechanism is configured in such a way as to restrict relative rotation of the spat around a clutch axis, and to allow the relative rotation of the spat around the clutch axis, based on external force input to the spat. The link mechanism includes a rotation shaft member and a movement shaft member. A line along an axis of the rotation shaft member is a rotation axis in movement of the spat between the deployed position and the retracted position. A line along an axis of the movement shaft member is the clutch axis. A direction from the front end of the vehicle toward a rear end of the vehicle is assumed to be a rear side. The vehicle spat device is configured in such a way that the movement shaft member can rotate around the rotation axis, on the rear side of the rotation shaft member. When the spat is at the retracted position, the movement shaft member is arranged at a position on the rear side of and a vertically upper side of the rotation shaft member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

The following describes a spat device 10 that is one embodiment of a vehicle spat device.

Figure 1:
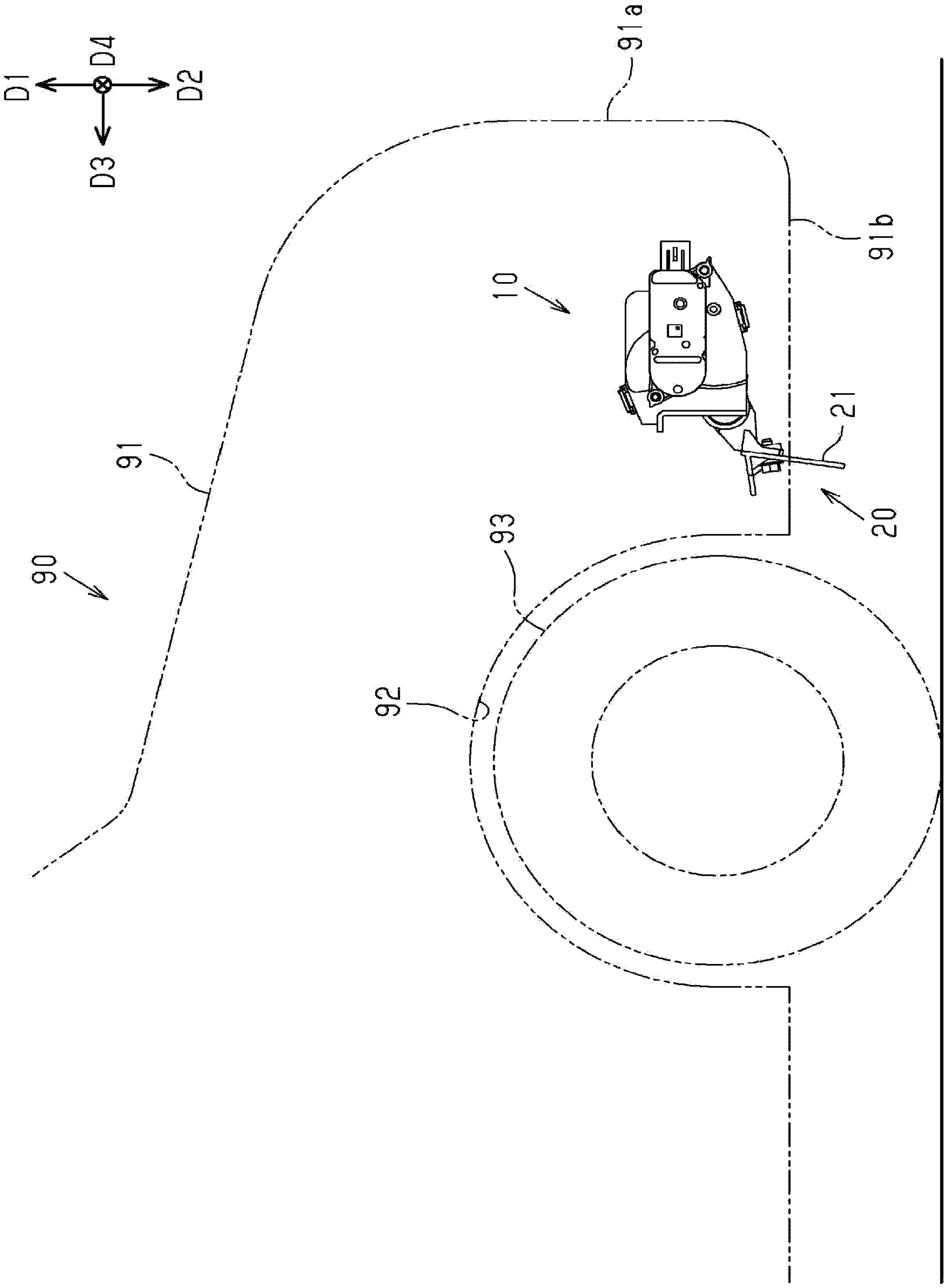
FIG. 1 is a schematic diagram illustrating one embodiment of a vehicle spat device, and a vehicle to which the vehicle spat device is applied.

As illustrated in FIG. 1, the spat device 10 is applied to a vehicle 90.

The vehicle 90 includes a plurality of wheels. For example, the vehicle 90 includes four wheels. FIG. 1 illustrates one front wheel 93 among the wheels included in the vehicle 90. The vehicle 90 includes a vehicle body 91. The vehicle body 91 includes a wheel house 92 that accommodates the front wheel 93.

In FIG. 1 to FIG. 6, the arrow indicating a vertically upper side is represented as an upper side D1, and the arrow indicating a vertically lower side is represented as a lower side D2. In FIG. 1 to FIG. 6, the arrow indicating a direction from a front end 91*a* to a rear end in the vehicle body 91 of the vehicle 90 is represented as a rear side D3. In FIG. 1 to FIG. 6, the arrow indicating one direction in vehicle width directions of the vehicle 90 is represented as a width direction D4.

As illustrated in FIG. 1, the spat device 10 is attached to the vehicle body 91. For example, the spat device 10 is attached to a position closer to the front end 91*a* than the front wheel 93. For example, the vehicle 90 includes the spat device 10 associated with each of the front wheels. FIG. 1 schematically illustrates the vehicle 90 and the spat device 10, and a size of the spat device 10 in relation to the vehicle 90 in FIG. 1 does not represent an actual size of the spat device 10.

Figure 2:
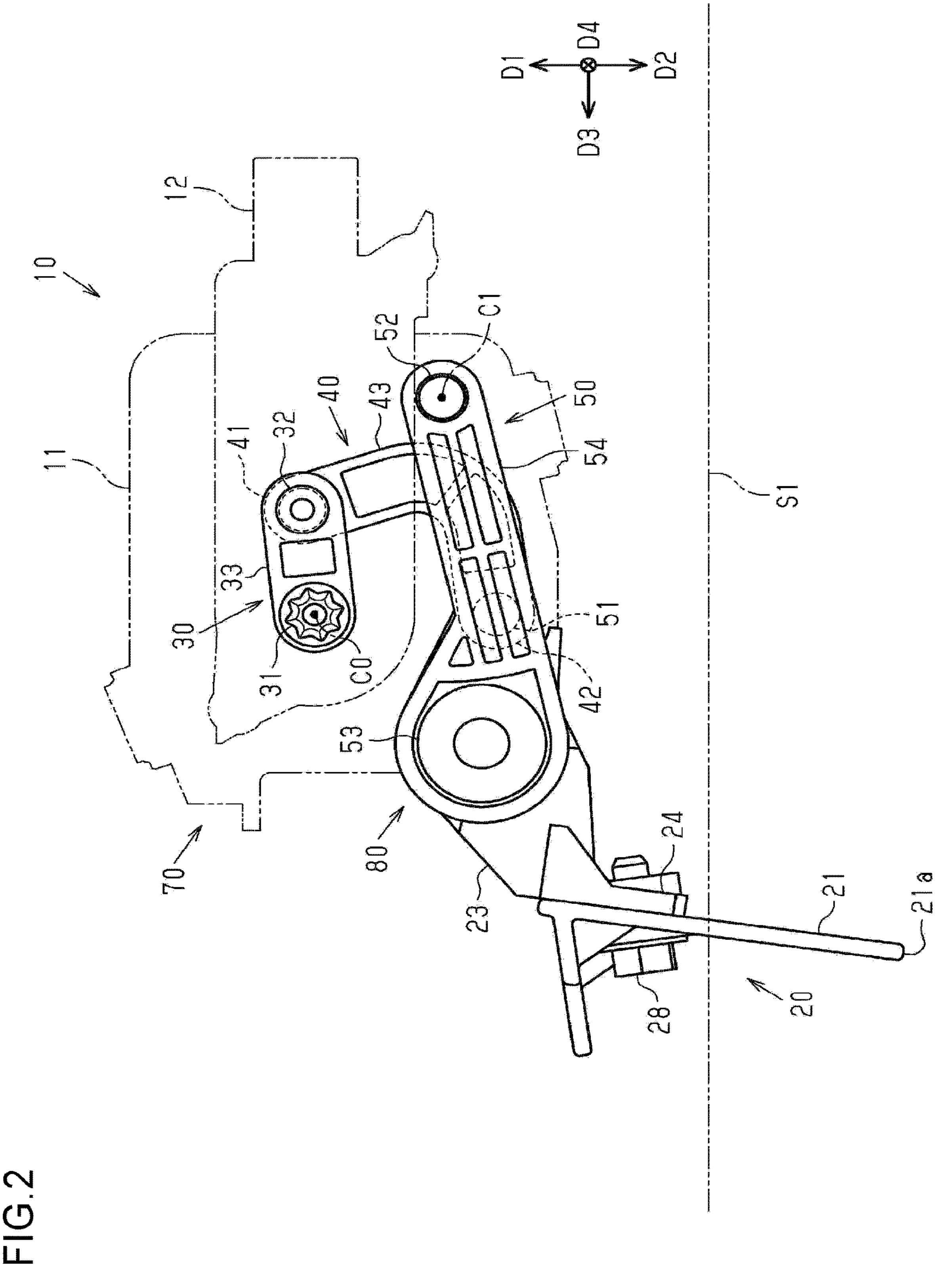
FIG. 2 is a side view concerning the vehicle spat device in FIG. 1 and illustrating a state where a spat is supported at a deployed position.
Figure 3:
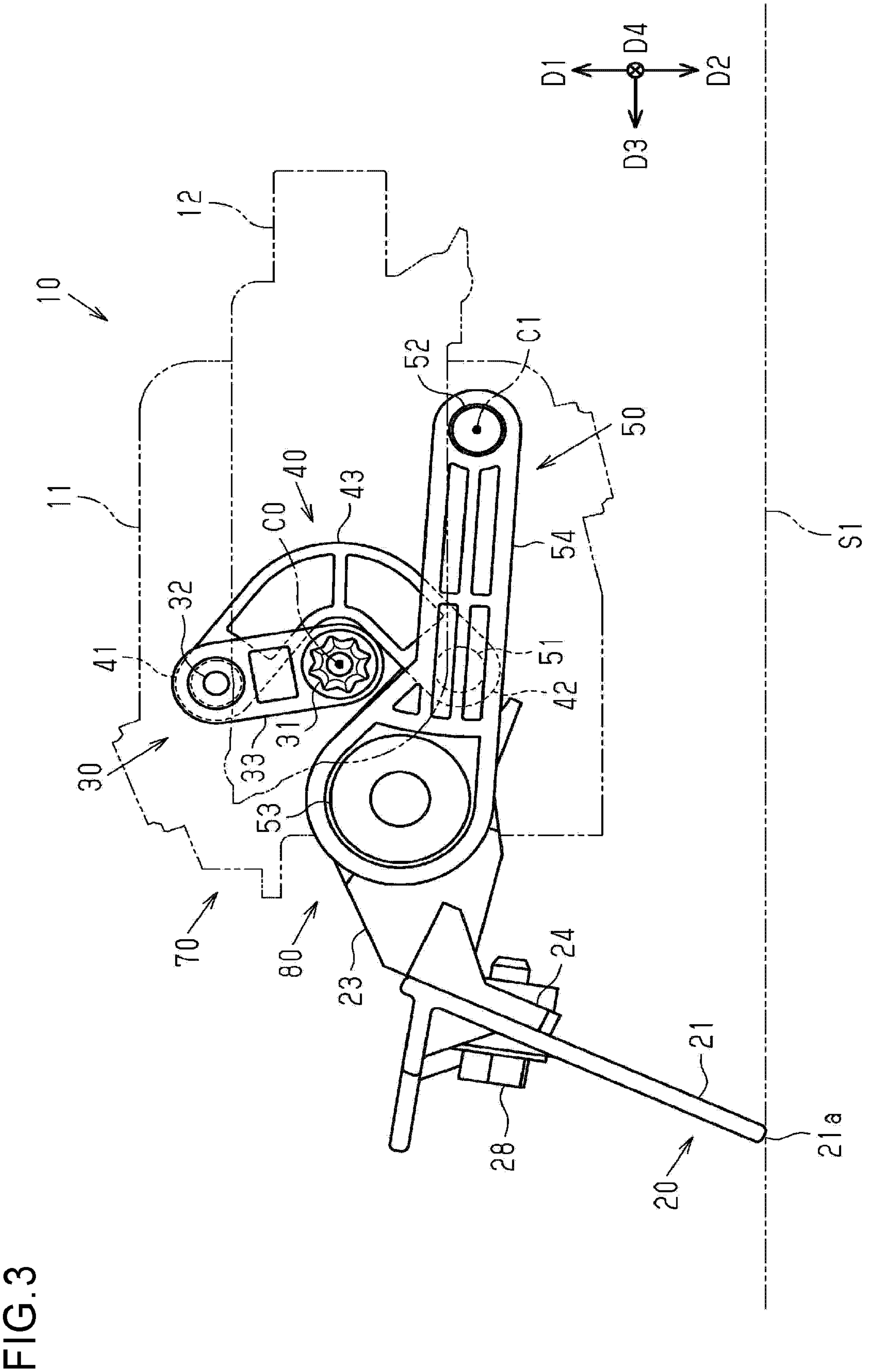
FIG. 3 is a side view concerning the vehicle spat device in FIG. 1 and illustrating a state where the spat is supported at a retracted position.

As illustrated in FIG. 1 to FIG. 3, the spat device 10 includes a spat 20.

As illustrated in FIG. 2 and FIG. 3, the spat device 10 includes a link mechanism 70 that can move the spat 20.

The spat device 10 may include an actuator 12 that applies, to the link mechanism 70, drive force of moving the spat 20. One example of the actuator 12 includes an electric motor as a drive source. In this case, rotational motion driven by the electric motor is transmitted to the link mechanism 70, and thereby, the spat 20 is moved.

The spat device 10 includes a clutch mechanism 80. The clutch mechanism 80 is described below.

The spat device 10 may include a case 11. For example, the link mechanism 70 can be accommodated in the case 11. In one example, the case 11 is constituted by a plurality of divided bodies that accommodate the link mechanism 70 in such a way as to sandwich the link mechanism 70. For example, the actuator 12 can be attached on an outer side of the case 11. The spat device 10 is attached to the vehicle 90, for example, by fixing the case 11 to the vehicle body 91.

The spat device 10 may include a base 23 to which the spat 20 is fixed. For example, the spat 20 is attached to the link mechanism 70 via the base 23. For example, the spat 20 is fixed to the base 23 by a fastening member 28. One example of the base 23 includes a support portion 24 for fixing the spat 20, and an insertion hole 25 to which the link mechanism 70 is attached.

<Spat>

The spat 20 is an aerodynamic member of the vehicle 90. The aerodynamic member is a member that can improve aerodynamic performance of the vehicle 90 by rectifying a travelling wind to hit the wheel.

As illustrated in FIG. 1, the spat 20 includes a flap portion 21 that functions as an aerodynamic member. One example of the flap portion 21 has a plate shape that intersects with a travelling wind toward the front wheel 93, at the below-described deployed position P1. FIG. 1 illustrates a state where the spat 20 is arranged at the deployed position P1.

The spat device 10 allows the flap portion 21 in the spat 20 to be arranged on a lower side D2 of a lower end 91*b* of the vehicle body 91. The lower end 91*b* of the vehicle body 91 corresponds to the lowest end on a lower side D2 in the vehicle body 91.

<Deployed Position and Retracted Position>

The spat device 10 allows the spat 20 to be moved between the deployed position P1 and a retracted position P0 by the link mechanism 70.

FIG. 2 illustrates the spat device 10 in a state of supporting the spat 20 at the deployed position P1.

The deployed position P1 is set as a position where the spat 20 is arranged closer to the front end 91*a* than the front wheel 93. The deployed position P1 is a position where the spat 20 is arranged at a position of rectifying a travelling wind to hit the wheel, in order to make the flap portion 21 function as the aerodynamic member.

FIG. 3 illustrates the spat device 10 in a state of supporting the spat 20 at the retracted position P0.

The retracted position P0 is set as a position where the spat 20 is retracted. One example of the retracted position P0 is set as a position where the spat 20 is moved from the deployed position P1 to an upper side D1. For example, the retracted position P0 is set in such a way that when the spat 20 is arranged at the retracted position P0, a distal end 21*a* of the flap portion 21 is located on an upper side D1 of the lower end 91*b* of the vehicle 90.

FIG. 2 and FIG. 3 illustrate the retraction underline S1 indicating a horizontal imaginary plane. At the deployed position P1 represented in FIG. 2, the flap portion 21 is arranged on a lower side D2 of the retraction underline S1. At the retracted position P0 illustrated in FIG. 3, the flap portion 21 is arranged in such a way that the distal end 21*a* of the flap portion 21 is located on an upper side D1 of the retraction underline S1. In one example, the retraction underline S1 is along the lower end 91*b* of the vehicle 90 on a horizontal road surface.

For example, the spat device 10 supports the spat 20 at the retracted position P0 when the vehicle 90 is in a stopped state. For example, the spat device 10 moves the spat 20 from the retracted position P0 to the deployed position P1 when a travelling speed of the vehicle 90 becomes equal to or higher than a predetermined speed. For example, the spat device 10 moves the spat 20 from the deployed position P1 to the retracted position P0 when a traveling speed of the vehicle 90 becomes, from a speed equal to or higher than the predetermined speed, lower than the predetermined speed. When the spat 20 is configured in such a way as to be moved as described above, the spat 20 is supported at the retracted position P0 while the vehicle 90 is traveling at a low speed lower than the predetermined speed.

<Link Mechanism>

One example of the link mechanism 70 is described with reference to FIG. 2, FIG. 3, FIG. 4, and FIG. 5.

The link mechanism 70 includes a drive link member 30, a transmission link member 40, a main link member 50, and a sub-link member 60.

Figure 4:
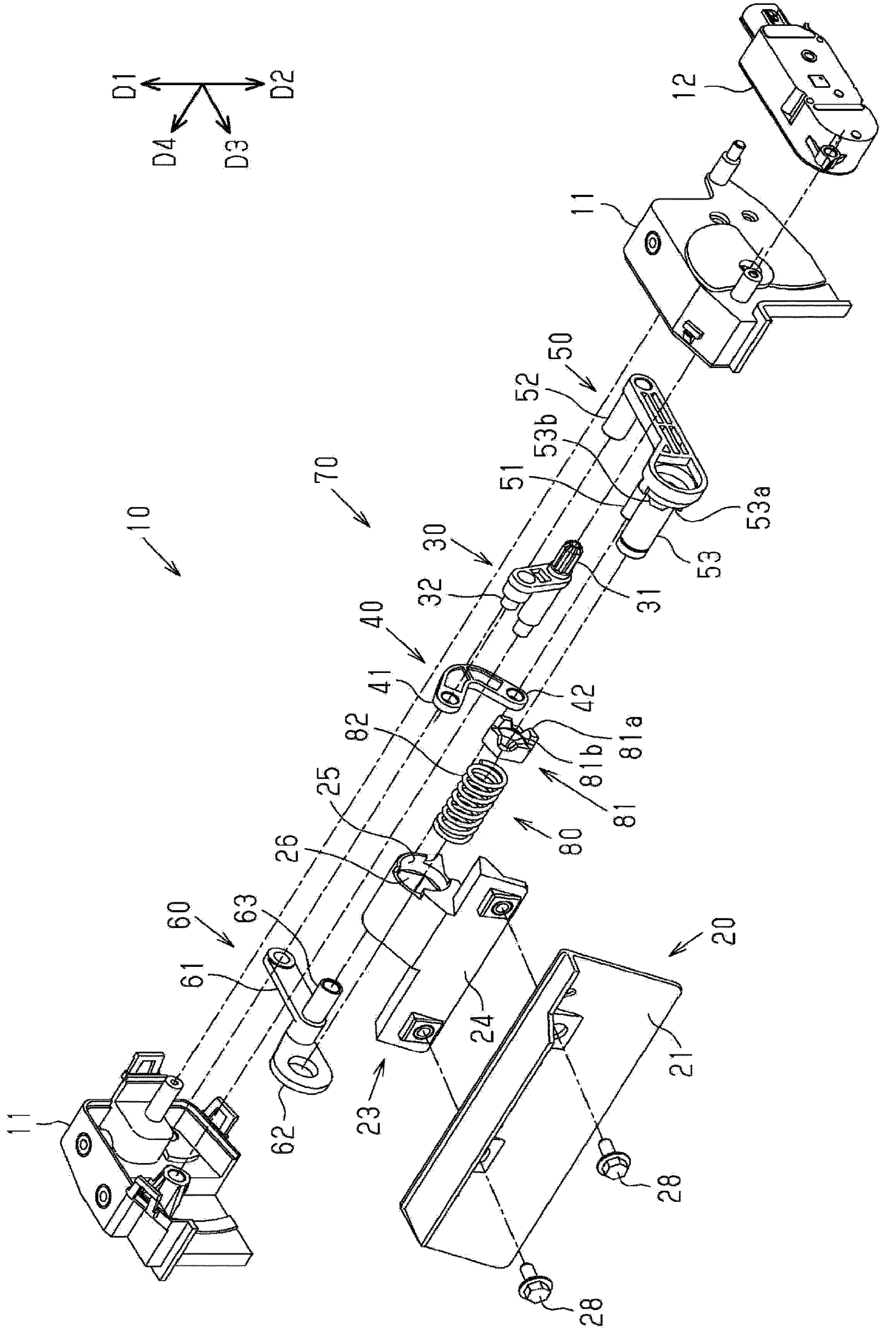
FIG. 4 is an exploded perspective view of the vehicle spat device in FIG. 1.

As illustrated in FIG. 2 to FIG. 4, the drive link member 30 includes an input shaft member 31, an output shaft member 32, and a drive link body 33. The input shaft member 31 and the output shaft member 32 are shaft members extending in the width direction D4, in postures when the spat device 10 is mounted on the vehicle 90. The drive link body 33 couples the input shaft member 31 and the output shaft member 32 to each other. The input shaft member 31 is connected to the actuator 12. The input shaft member 31 is configured in such a way as to rotate by drive force generated by the actuator 12. The output shaft member 32 can rotate integrally with the input shaft member 31.

Figure 5:
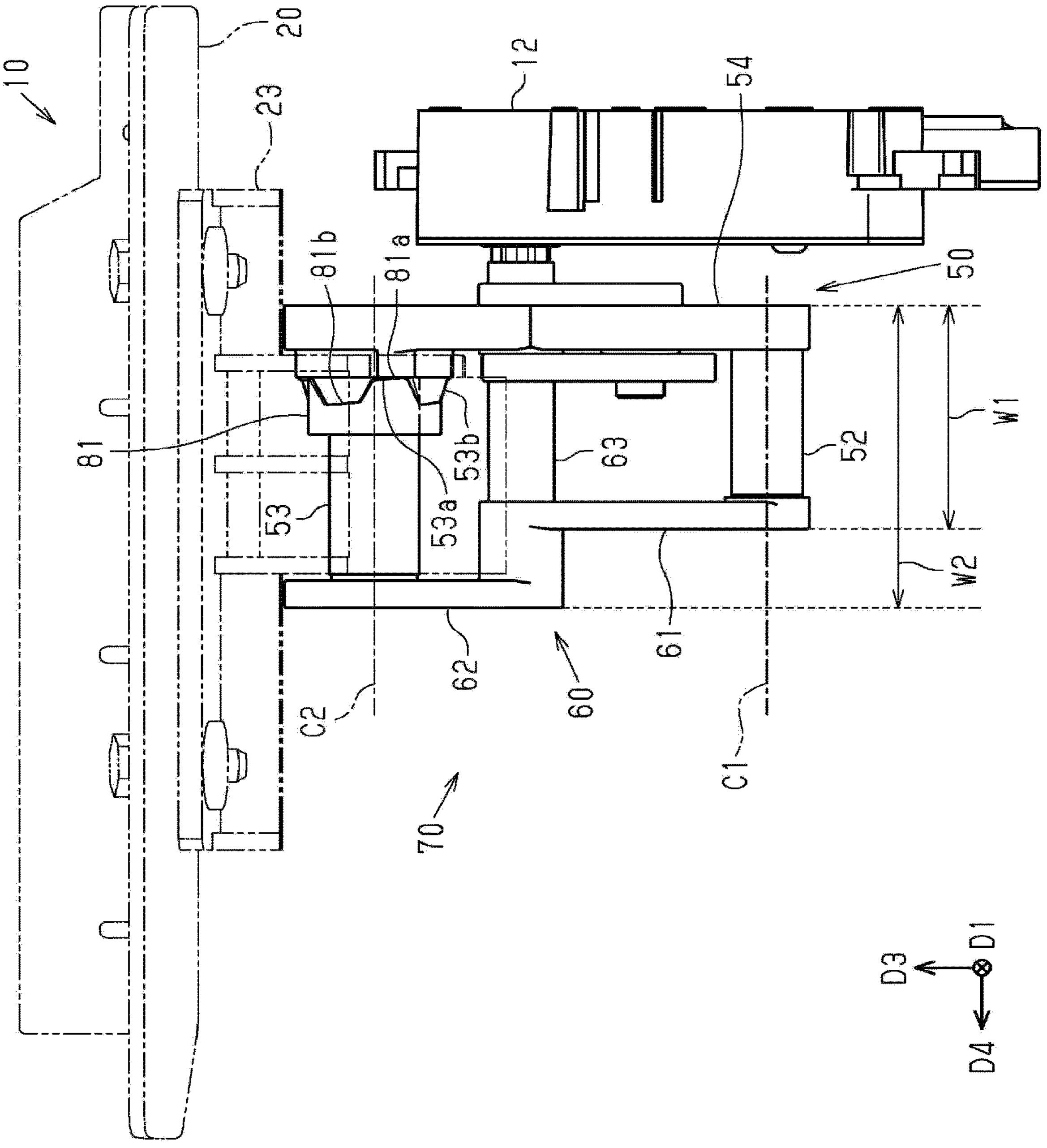
FIG. 5 is a bottom view in which the vehicle spat device of FIG. 1 is viewed from a lower side of a vehicle.

As illustrated in FIG. 4 and FIG. 5, the main link member 50 and the sub-link member 60 constitute a pair of link members.

As illustrated in FIG. 2 to FIG. 4, the main link member 50 includes a coupling shaft member 51, a rotation shaft member 52, a movement shaft member 53, and a main link body 54. The coupling shaft member 51, the rotation shaft member 52, and the movement shaft member 53 are shaft members whose base ends are at the main link body 54 and that extend in the width direction D4, in postures when the spat device 10 is mounted on the vehicle 90. The rotation shaft member 52 is rotatably supported by the case 11. The rotation shaft member 52 is supported at a position on a lower side D2 of the input shaft member 31 of the drive link member 30. The movement shaft member 53 is arranged at a position on a rear side D3 of the rotation shaft member 52. The coupling shaft member 51 is located between the rotation shaft member 52 and the movement shaft member 53.

As illustrated in FIG. 4 and FIG. 5, the sub-link member 60 includes a shaft-shaped protrusion portion 63 coupled to the coupling shaft member 51 of the main link member 50. The sub-link member 60 includes a first plate portion 61 and a second plate portion 62 that extend from the shaft-shaped protrusion portion 63. The first plate portion 61 extends from the shaft-shaped protrusion portion 63 toward the rotation shaft member 52. The first plate portion 61 is coupled to the rotation shaft member 52. The second plate portion 62 extends from the shaft-shaped protrusion portion 63 toward the movement shaft member 53. The second plate portion 62 is coupled to the movement shaft member 53.

As illustrated in FIG. 2 to FIG. 4, the movement shaft member 53 is inserted into the base 23. More specifically, as illustrated in FIG. 4, the movement shaft member 53 is inserted into the insertion hole 25 of the base 23. The insertion hole 25 is formed in such a way as to extend in the width direction D4, in a posture when the spat device 10 is mounted on the vehicle 90.

At the deployed position P1 and the retracted position P0, the support portion 24 included in the base 23 is located on a rear side D3 of the insertion hole 25 into which the movement shaft member 53 is inserted. Thus, the spat device 10 includes the base 23, and thereby, the spat 20 is supported at a position shifted from the movement shaft member 53 to a rear side D3 by a length from the insertion hole 25 to the support portion 24 in the base 23.

As illustrated in FIG. 2 to FIG. 4, the transmission link member 40 includes a first coupling portion 41, a second coupling portion 42, and a transmission link body 43. The first coupling portion 41 is coupled to the output shaft member 32 of the drive link member 30. The second coupling portion 42 is coupled to the coupling shaft member 51 of the main link member 50. The transmission link body 43 couples the first coupling portion 41 and the second coupling portion 42 to each other. For example, the transmission link body 43 has a curved line connecting the first coupling portion 41 and the second coupling portion 42 to each other. For example, the transmission link body 43 is bent into an L-shape.

Motion of the link mechanism 70 when the spat 20 is moved between the deployed position P1 and the retracted position P0 is described with reference to FIG. 2 and FIG. 3.

FIG. 2 and FIG. 3 represent a drive axis C0 that is a line along the axis of the input shaft member 31. FIG. 2 and FIG. 3 represent a rotation axis C1 that is a line along the axis of the rotation shaft member 52.

When the spat 20 is moved from the retracted position P0 illustrated in FIG. 3 to the deployed position P1 illustrated in FIG. 2, the movement shaft member 53 rotates counterclockwise around the rotation axis C1 in FIG. 3. This rotational movement causes the spat 20 to be drawn to a lower side D2. Thereby, the spat 20 can be moved from the retracted position P0 to the deployed position P1. As illustrated in FIG. 2, at the deployed position P1, the movement shaft member 53 of the main link member 50 is located on a rear side D3 of and on a lower side D2 of the rotation shaft member 52.

When the spat 20 is moved from the deployed position P1 illustrated in FIG. 2 to the retracted position P0 illustrated in FIG. 3, the movement shaft member 53 rotates clockwise around the rotation axis C1 in FIG. 2. This rotational movement causes the spat 20 to be drawn to an upper side D1. Thereby, the spat 20 can be moved from the deployed position P1 to the retracted position P0. As illustrated in FIG. 3, at the retracted position P0, the movement shaft member 53 of the main link member 50 is located on a rear side D3 of and on an upper side D1 of the rotation shaft member 52.

As illustrated in FIG. 2 and FIG. 3, at the deployed position P1 and the retracted position P0, the input shaft member 31, the movement shaft member 53, and the rotation shaft member 52 are arranged from the front end 91*a* of the vehicle 90 toward a rear side D3 in the order of the rotation shaft member 52, the input shaft member 31, and the movement shaft member 53. The spat device 10 allows the movement shaft member 53 to move to an upper side D1 in such a way as to approach the input shaft member 31, at the time of moving the spat 20 from the deployed position P1 to the retracted position P0.

The motion when the spat 20 is moved from the retracted position P0 to the deployed position P1 is more specifically described as one example. Although the details are omitted, the spat 20 can be moved from the deployed position P1 to the retracted position P0 by motion reversed from that described below.

Rotation of the input shaft member 31 of the drive link member 30 by drive force of the actuator 12 can rotate the output shaft member 32 around the drive axis C0. Specifically, clockwise rotation of the input shaft member 31 in FIG. 3 rotates the output shaft member 32 clockwise around the drive axis C0 in FIG. 3.

The clockwise rotation of the output shaft member 32 in FIG. 3 around the drive axis C0 moves, to a lower side D2, the transmission link member 40 coupled to the output shaft member 32. The movement of the transmission link member 40 to a lower side D2 draws, to a lower side D2, the coupling shaft member 51 of the main link member 50 coupled to the transmission link member 40.

The rotation shaft member 52 is supported by the case 11, and thereby, the main link member 50 can move in such a way that the movement shaft member 53 rotates around the rotation axis C1. In other words, when the coupling shaft member 51 is drawn to a lower side D2, the main link member 50 moves in such a way that the movement shaft member 53 rotates counterclockwise around the rotation axis C1 in FIG. 3. Thereby, the spat 20 can be moved from the retracted position P0 to the deployed position P1.

The link mechanism 70 is further described with reference to FIG. 5. FIG. 5 omits illustrations of some of the members included in the spat device 10, for convenience of description.

The link mechanism 70 has a stepped structure including a wide portion and a narrow portion whose length in the width direction D4 is shorter than that of the wide portion. One example of the stepped structure is specifically described.

As illustrated in FIG. 5, in the link mechanism 70, a length of the rotation shaft member 52 included in the main link member 50 is shorter than a length of the movement shaft member 53 included in the main link member 50. In other words, a distal end of the rotation shaft member 52 whose base end is at the main link body 54 is at a position closer to the main link body 54 than a distal end of the movement shaft member 53 whose base end is at the main link body 54.

The sub-link member 60 is configured in such a way that the first plate portion 61 is arranged at a position closer to the main link body 54 than the second plate portion 62. The first plate portion 61 is coupled to the rotation shaft member 52, at a position closer to the main link body 54 by a length by which the rotation shaft member 52 is shorter than the movement shaft member 53.

FIG. 5 represents, as a first width W1, a length between the main link body 54 and the first plate portion 61 in the width direction D4. A length between the main link body 54 and the second plate portion 62 in the width direction D4 is represented as a second width W2. The first width W1 is shorter than the second width W2.

A range having a length of the second width W2 in the link mechanism 70 corresponds to "wide portion". A range having a length of the first width W1 in the link mechanism 70 corresponds to "narrow portion". In other words, a length of the narrow portion in the width direction D4 is shorter than that of the wide portion. The link mechanism 70 has the stepped structure based on a relation between the narrow portion and the wide portion. The case 11 has a shape that follows the stepped structure.

<Clutch Mechanism>

Figure 6:
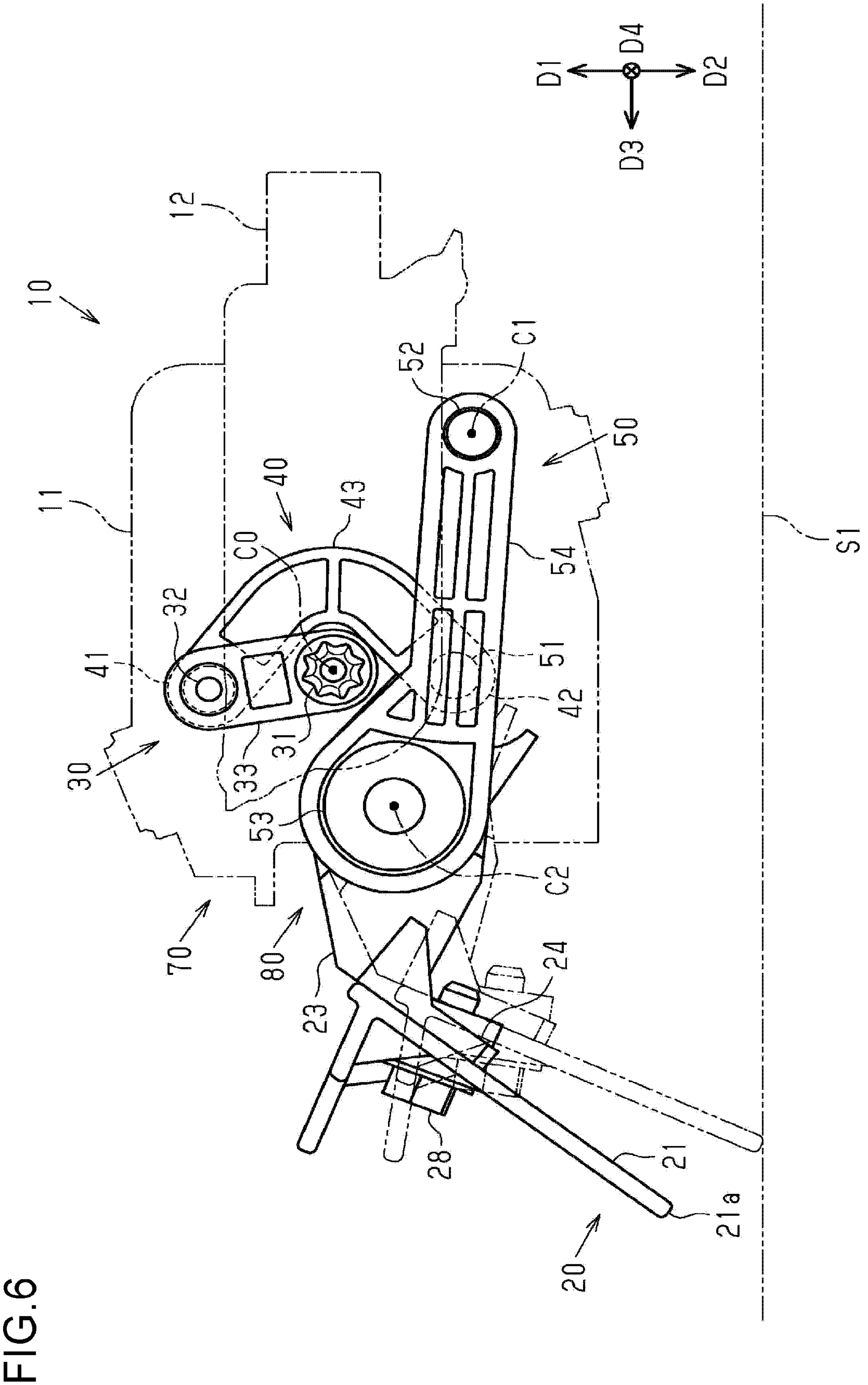
FIG. 6 is a side view concerning the vehicle spat device in FIG. 1 and illustrating a state where a clutch mechanism is activated.

The clutch mechanism 80 is described. FIG. 6 represents a clutch axis C2 that is a line along the axis of the movement shaft member 53. The clutch mechanism 80 restricts relative rotation of the spat 20 around the clutch axis C2 as a rotation center, and allows relative rotation of the spat 20 around the clutch axis C2 as the rotation center, based on an input of external force to the spat 20. Specifically, in a state where the clutch mechanism 80 is not activated, the movement shaft member 53 and the spat 20 are supported integrally with each other. In a state where the clutch mechanism 80 is activated, the spat 20 can be moved relative to the movement shaft member 53.

A mode of allowing rotation of the spat 20 arranged at the retracted position P0 is described as one example. FIG. 6 illustrates, with the solid lines, a state where the spat 20 is retreated from the retracted position P0 under activation of the clutch mechanism 80. For comparison, FIG. 6 illustrates, with the two-dot chain lines, the spat 20 and the base 23 arranged at the retracted position P0. In a state where the clutch mechanism 80 is activated, the spat 20 can be retreated to an upper side D1 by rotating clockwise around the clutch axis C2 as the rotation center in FIG. 6. In this manner, the spat 20 can be retreated from the retracted position P0 illustrated with the two-dot chain lines in FIG. 6 to the position illustrated with the solid lines.

A detailed configuration of the clutch mechanism 80 is not particularly limited. The following describes one example of the clutch mechanism 80.

The spat device 10 includes a clutch member 81 and a coil spring 82 as illustrated in FIG. 4.

The clutch mechanism 80 includes the movement shaft member 53, the clutch member 81, the coil spring 82, and the base 23.

The clutch member 81 has an external shape of a flat hexagonal hollow prism. The clutch member 81 is arranged coaxially with the movement shaft member 53. Specifically, the movement shaft member 53 is inserted into a hollow portion in the hexagonal prism of the clutch member 81.

The clutch member 81 includes a crest portion 81*a* and a trough portion 81*b*. The crest portions 81*a* and the trough portion 81*b* are formed on a surface that faces a base end of the movement shaft member 53. The crest portions 81*a* and the trough portions 81*b* are arranged in such a way as to alternate continuously around the clutch axis C2.

A first reception portion 53*a* and a second reception portion 53*b* are formed at the base end of the movement shaft member 53. The first reception portions 53*a* and the second reception portions 53*b* are arranged in such a way as to alternate continuously around the clutch axis C2. The first reception portion 53*a* has a shape that can mesh with the crest portion 81*a* of the clutch member 81. The second reception portion 53*b* has a shape that can mesh with the trough portion 81*b* of the clutch member 81. Thus, the crest portion 81*a* and the trough portion 81*b* can mesh with the first reception portion 53*a* and the second reception portion 53*b*.

The crest portion 81*a*, the trough portion 81*b*, the first reception portion 53*a*, and the second reception portion 53*b* are configured in such a way that the crest portion 81*a* and the second reception portion 53*b* ride onto each other when force of rotation around the clutch axis C2 acts on the clutch member 81 and the movement shaft member 53 that are in a state of meshing with each other. For example, when force of rotation acts in one direction of rotational directions around the clutch axis C2 as the rotation center, the crest portion 81*a* and the second reception portion 53*b* can ride onto each other. Meanwhile, when force of rotation acts in the other direction of the rotational directions around the clutch axis C2 as the rotation center, the crest portion 81*a* and the second reception portion 53*b* cannot ride onto each other.

When the crest portion 81*a* and the second reception portion 53*b* ride onto each other, the meshing of the crest portion 81*a* and the trough portion 81*b* with the first reception portion 53*a* and the second reception portion 53*b* is released. When the crest portion 81*a* and the second reception portion 53*b* ride onto each other, the clutch member 81 and the base end of the movable shaft member 53 become separated from each other on the clutch axis C2. In other words, the clutch member 81 and the movement shaft member 53 are configured in such a way as to enable force of rotation around the clutch axis C2 to be converted into force along the clutch axis C2.

The clutch member 81 is inserted into the insertion hole 25 of the base 23 together with the movement shaft member 53, in a state where the movement shaft member 53 is inserted into the clutch member 81 in such a way that the clutch member 81 is rotatable and movable in the axial direction relative to the movement shaft member 53. The insertion hole 25 of the base 23 includes a hexagonal hole portion 26. The clutch member 81 inserted into the insertion hole 25 is fitted into the hexagonal hole portion 26 in such a way as to be non-rotatable but movable in the axial direction relative to the hexagonal hole portion 26.

The coil spring 82 is inserted into the insertion hole 25 together with the clutch member 81, in a state where the movement shaft member 53 is inserted into the clutch member 81, and in a state where the movement shaft member 53 is inserted into the coil spring 82. The clutch member 81 and the coil spring 82 are arranged in the order of the clutch member 81 and the coil spring 82 in a direction from the base end of the movement shaft member 53 to the distal end of the movement shaft member 53 on the clutch axis C2. One end of the coil spring 82 is in contact with the clutch member 81. The other end of the coil spring 82 is in contact with the second plate portion 62 of the sub-link member 60, for example. The coil spring 82 is compressed along the clutch axis C2. The coil spring 82 biases the clutch member 81 in a direction of pressing the clutch member 81 against the base end of the movement shaft member 53.

In a state where the clutch mechanism 80 is not activated, the clutch member 81 is pressed against the base end of the movement shaft member 53 by the biasing force of the coil spring 82, and thereby, the crest portion 81*a* and the trough portion 81*b* mesh with the first reception portion 53*a* and the second reception portion 53*b*. The clutch mechanism 80 is configured in such a way that the clutch member 81 and the movement shaft member 53 rotate integrally with each other by meshing of the crest portion 81*a* and the trough portion 81*b* with the first reception portion 53*a* and the second reception portion 53*b*. In this manner, the movement shaft member 53 and the spat 20 are supported integrally with each other. In other words, rotation of the spat 20 relative to the movement shaft member 53 is restricted.

In the clutch mechanism 80, the crest portion 81*a* and the second reception portion 53*b* slide on each other in such a way as to ride onto each other, thereby generating force in a direction of separating the clutch member 81 and the base end of the movement shaft member 53 from each other. When acting of such force separates the clutch member 81 and the base end of the movement shaft member 53 from each other against the biasing force of the coil spring 82, relative rotation between the clutch member 81 and the movement shaft member 53 is allowed. Thereby, rotation of the spat 20 relative to the movement shaft member 53 is allowed.

For the clutch mechanism 80, a threshold value that concerns external force and at which the clutch mechanism 80 is activated is set based on shapes of the crest portion 81*a*, the trough portion 81*b*, the first reception portions 53*a*, and the second reception portions 53*b*, and the biasing force of the coil spring 82. Thus, changing the shapes of the crest portion 81*a*, the trough portion 81*b*, the first reception portion 53*a*, and the second reception portion 53*b*, and the biasing force of the coil spring 82 can adjust a threshold value that concerns the external force and at which the clutch mechanism 80 is activated.

In the above-described example, the spat 20 arranged at the retracted position P0 is retreated by activation of the clutch mechanism 80. The spat device 10 is configured in such a way that the clutch mechanism 80 can be activated even when the spat 20 is arranged at the deployed position P1. In other words, even when the spat 20 is arranged at the deployed position P1, rotation of the spat 20 relative to the movement shaft member 53 can be allowed.

Effects of Present Embodiment

According to the spat device 10, in a state where the spat 20 is arranged at the deployed position P1 as illustrated in FIG. 2, the clutch mechanism 80 is activated based on external force that is input to the spat 20 and that is force in a direction of pressing the spat 20 to a rear side D3.

According to the spat device 10, in a state where the spat 20 is arranged at the retracted position P0 as illustrated in FIG. 3, the clutch mechanism 80 is activated based on input external force in a direction of thrusting up the spat 20 to an upper side D1.

The spat 20 rotates relative to the movement shaft member 53 by activation of the clutch mechanism 80, and thereby, the spat 20 can be retreated to an upper side D1 as illustrated in FIG. 6. Thus, according to the spat device 10, when the clutch mechanism 80 is activated based on an input of external force to the spat 20, the spat 20 can be relatively rotated with the rotation center being the clutch axis C2 independent of the rotation axis C1. Thereby, regardless of a position at which the spat 20 is arranged, the clutch mechanism 80 can allow the relative rotation of the spat 20 when external force is applied to the spat 20.

Examples of a case where external force large enough for the clutch mechanism 80 to be activated is input to the spat 20 include a case where the spat 20 interferes with an obstacle while the vehicle 90 is travelling.

The spat device 10 includes the base 23 to which the spat 20 is fixed. Thus, the spat 20 is supported at a position shifted from the movement shaft member 53 to a rear side D3 by a length from the insertion hole 25 to the support portion 24 in the base 23. In other words, the clutch axis C2 and the spat 20 are separated from each other by a distance that is the length of the base 23.

In the spat device 10, the link mechanism 70 has the stepped structure. The stepped structure suppresses a spread of the link mechanism 70 in the width direction D4. A size of the spat device 10 in the width direction D4 can be made smaller than that in a case without the stepped structure.

Advantageous Effects of Present Embodiment (1) Regardless of a position at which the spat 20 is arranged, the spat device 10 can allow rotation of the spat 20 relative to the movement shaft member 53 when external force is applied to the spat 20. Thus, a load applied to the spat 20 can be alleviated in each of a case where the spat 20 is arranged at the retracted position P0 and a case where the spat 20 is arranged at the deployed position P1.

(2) The spat device 10 can increase a distance between the clutch axis C2 and a force application point of external force that can be applied to the spat 20. Thereby, the clutch mechanism 80 is easily activated even when external force input to the spat 20 is small. Since rotation of the spat 20 relative to the movement shaft member 53 is easily allowed when external force is input, the spat 20 can be prevented from receiving an excessively large load. If the spat 20 receives an excessively large load, there is a possibility that the spat 20 is deformed. According to the spat device 10, deformation of the spat 20 can be suppressed. Since the clutch mechanism 80 is easily activated, the clutch mechanism 80 can be suppressed from receiving an excessively large load.

(3) The spat device 10 can suppress a spread of the link mechanism 70 in the width direction D4. Thereby, a size of the spat device 10 in the width direction D4 can be reduced by an amount by which the first width W1 is shorter than the second width W2 in the stepped structure. In other words, the stepped structure contributes to reduction of a size of the spat device 10. Thus, in the vehicle 90 to which the spat device 10 is attached, a large space in the width direction D4 can be secured in relation to a position of the spat device 10.

Thus, according to the spat device 10, a space is easily secured around the spat device 10. Thereby, the spat device 10 can be suppressed from interfering with other members arranged around a place where the spat device 10 is attached. Other members can be easily arranged around the spat device 10 in such a way as to be suppressed from interfering with the spat device 10. Even when a space closer to the front end 91*a* of the vehicle 90 than the front wheel 93 of the vehicle 90 is limited, the spat device 10 can be easily attached.

(4) The spat device 10 is configured in such a way that when the spat 20 is at the retracted position P0, the movement shaft member 53 is arranged at a position on a rear side D3 of and on an upper side D1 of the rotation shaft member 52. Thus, when the spat 20 is arranged at the retracted position P0, the movement shaft member 53 can be arranged at a position separated from the retraction underline S1 to an upper side D1. In other words, the main link member 50 and the base 23 that is coupled to the movement shaft member 53 are easily arranged at positions separated from the retraction underline S1 to an upper side D1. Thereby, the main link member 50 and the base 23 can be suppressed from interfering with an obstacle or the like.

(5) If a clutch mechanism whose clutch axis is a line along the axis of the rotation shaft member 52 is adopted, there is a possibility that a size increase or complexity occurs around the rotation shaft member 52.

In contrast to this, according to the spat device 10, the movement shaft member 53 having the clutch axis C2 is a shaft member independent of the rotation shaft member 52. Thereby, the spat device 10 can make a size around the rotation shaft member 52 relatively small.

(6) According to the spat device 10, the main link member 50 including the rotation shaft member 52 includes the movement shaft member 53. Thus, rotation of the main link member 50 around the rotation axis C1 as a rotation center can move the spat 20. According to such a spat device 10, the spat 20 can be moved with a configuration simpler than that in a case of adopting a mechanism such as a four-joint link mechanism (7) According to the spat device 10, the movement shaft member 53 having the clutch axis C2 is a shaft member independent of the rotation shaft member 52. Thus, when external force of activating the clutch mechanism 80 is input, a path through which the external force is transmitted to the actuator 12 can be cut off without application of a load to the actuator 12.

Modified Examples

The present embodiment can be modified and implemented as follows. The present embodiment and the following modified examples can be implemented in combination with each other within a range in which a technical contradiction does not occur.

In the above-described embodiment, a length of the rotation shaft member 52 is shorter than a length of the movement shaft member 53. Alternatively, a length of the movement shaft member 53 may be shorter than a length of the rotation shaft member 52. Thereby, a stepped structure may be configured. Thus, the stepped structure possessed by the link mechanism 70 is not limited to the configuration exemplified in the above-described embodiment. It suffices that the stepped structure is constituted by a wide portion and a narrow portion whose length in the width direction D4 is shorter than that of the wide portion.

In the above-described embodiment, a length between the main link body 54 and the first plate portion 61 in the width direction D4 is set as a length corresponding to the narrow portion, and a length between the main link body 54 and the second plate portion 62 in the width direction D4 is set as a length corresponding to the wide portion. An origin point of the first width W1 and the second width W2 for defining the narrow portion and the wide portion is not limited to the main link body 54. It suffices that the origin point of the first width W1 is the same as the origin point of the second width W2. For example, on the assumption that a length between the drive link body 33 and the first plate portion 61 in the width direction D4 is set as a length corresponding to the narrow portion, a length between the drive link body 33 and the second plate portion 62 in the width direction D4 may be set as a length corresponding to the wide portion.

In the exemplification in the above-described embodiment, the link mechanism 70 has the stepped structure. The configuration in which the link mechanism 70 has the stepped structure is not essential for the spat device 10. For example, a length of the rotation shaft member 52 may be equal to a length of the movement shaft member 53.

The shape of the base 23 provided in the above-described embodiment is one example. A shape of the base 23 can be arbitrarily modified. Even when a shape of the base 23 is modified, a shape of the base 23 is preferably a shape that can support the spat 20 at a position separated from the movement shaft member 53.

The above-described embodiment exemplifies the configuration including the base 23 for fixing the spat 20. Instead of this, a configuration in which the spat 20 is directly coupled to the movement shaft member 53 may be adopted. In this case, for example, the spat preferably includes an insertion hole into which the movement shaft member 53 is inserted, and a hexagonal hole portion into which the clutch member 81 is fitted. In this case, the clutch mechanism 80 is constituted by the movement shaft member 53, the clutch member 81, the coil spring 82, and the spat.

A configuration of the clutch mechanism 80 may be arbitrarily modified. For example, shapes of the crest portion 81*a*, the trough portion 81*b*, the first reception portion 53*a*, and the second reception portion 53*b* may be arbitrarily modified. For example, a biasing member other than the coil spring 82 may be adopted. For example, a configuration in which the coil spring 82 is omitted may be adopted. It suffices that the clutch mechanism 80 restricts relative rotation of the spat 20 around the clutch axis C2 as a rotation center, and can allow relative rotation of the spat 20 around the clutch axis C2 as the rotation center, based on an input of external force to the spat 20.

A setting of the deployed position P1, a posture of the spat 20 supported at the deployed position P1, and the like may be arbitrarily modified. A setting of the retracted position P0, a posture of the spat 20 supported at the retracted position P0, and the like may be also arbitrarily modified.

In a state where the spat 20 is arranged at the retracted position P0, the flap portion 21 is preferably hidden when the vehicle 90 is viewed from a lateral side. However, for example, the following configuration may be adopted. For example, in a state where the spat 20 is arranged at the retracted position P0, the spat 20 may be supported in such a way that a part of the flap portion 21 protrudes as far as a position on a lower side D2 of the lower end 91*b* of the vehicle body 91.

Preferably, the spat 20 can retreat to a position on an upper side D1 of the retraction underline S1 when the spat 20 is retreated based on an input of external force to the spat 20 arranged at the deployed position P1. Without limitation to this, a part of the spat 20 may be arranged on a lower side D2 of the retraction underline S1 in a state where the spat 20 is retreated. It suffices that the spat device 10 includes a configuration that can effectively alleviate an impact load applied to the spat 20. However, from a viewpoint of alleviating an impact load, a stroke at the time of retreating of the spat 20 is preferably large.

An input direction of external force that activates the clutch mechanism 80 in a state where the spat 20 is supported at the retracted position P0 is not limited to the direction exemplified in the above-described embodiment. The clutch mechanism 80 is activated by external force that is not limited to external force in a direction of thrusting up the spat 20 to an upper side D1, and thus, relative rotation of the spat 20 is allowed so that the spat device 10 can alleviate a load based on the external force input to the spat 20.

In the above-described embodiment, the spat device 10 includes the actuator 12 that applies drive force to the link mechanism 70. The spat device 10 may be configured without including the actuator 12. For example, a configuration in which drive force generated by a manual operation of a user is transmitted to the link mechanism 70 via a wire cable or the like may be adopted.

In the exemplification in the above-described embodiment, the spat device 10 is attached at a position closer to the front end 91*a* of the vehicle 90 than the front wheel 93 of the vehicle 90. Without limitation to this, the spat device 10 may be attached at a position where the spat device 10 can rectify a travelling wind flowing toward a rear wheel of the vehicle 90, for example. In other words, a wheel for a case where the spat 20 is arranged at a position closer to the front end 91*a* than the wheel can be arbitrarily set. A shape and a size of the spat 20 may also be modified arbitrarily.

Each aspect of a vehicle spat device for solving the above-described problem is described.

[Aspect 1] A vehicle spat device includes a spat, a link mechanism, and a clutch mechanism. The spat is an aerodynamic member of a vehicle. The link mechanism can move the spat between a deployed position where the spat is arranged at a position closer to a front end of the vehicle than a wheel included in the vehicle and a retracted position where the spat is retracted. The clutch mechanism is configured in such a way as to restrict relative rotation of the spat around a clutch axis, and to allow the relative rotation of the spat around the clutch axis, based on external force input to the spat. The link mechanism includes a rotation shaft member and a movement shaft member. A line along an axis of the rotation shaft member is a rotation axis in movement of the spat between the deployed position and the retracted position. A line along an axis of the movement shaft member is the clutch axis. A direction from the front end of the vehicle toward a rear end of the vehicle is assumed to be a rear side. The vehicle spat device is configured in such a way that the movement shaft member can rotate around the rotation axis, on the rear side of the rotation shaft member. When the spat is at the retracted position, the movement shaft member is arranged at a position on the rear side of and a vertically upper side of the rotation shaft member.

According to the above-described configuration, when the clutch mechanism is activated based on external force input to the spat, the spat can be relatively rotated around the clutch axis being independent of the rotation axis as a rotation center. Thereby, regardless of a position at which the spat is arranged, the clutch mechanism can allow relative rotation of the spat when external force is applied to the spat. Thus, even when the spat is arranged at the retracted position, a load applied to the spat can be alleviated.

[Aspect 2] The vehicle spat device according to the aspect 1 includes a base to which the spat is fixed. The movement shaft member and the base are coupled to each other.

According to the above-described configuration, a distance between the spat and the clutch axis is increased by a length of the base. Thereby, a force application point of external force that may be applied to the spat can be separated from the clutch axis. When external force is input, relative rotation of the spat is easily allowed, and thus, the spat is suppressed from receiving an excessively large load.

[Aspect 3] In the vehicle spat device according to the aspect 1 or the aspect 2, the link mechanism has a stepped structure including a wide portion and a narrow portion whose length in a width direction of the vehicle is shorter than that of the wide portion.

According to the above-described configuration, spread of the link mechanism in the width direction can be suppressed. Thereby, a space can be easily secured around the spat device.

According to the aspects of this disclosure, regardless of a position at which the spat is arranged, a load applied to the spat can be alleviated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle spat device comprising:

a spat being an aerodynamic member of a vehicle;

a link mechanism that can move the spat between a deployed position where the spat is arranged at a position closer to a front end of the vehicle than a wheel included in the vehicle and a retracted position where the spat is retracted; and a clutch mechanism configured in such a way as to restrict relative rotation of the spat around a clutch axis, and to allow the relative rotation of the spat around the clutch axis, based on external force input to the spat, wherein the link mechanism includes a rotation shaft member and a movement shaft member, a line along an axis of the rotation shaft member is a rotation axis in movement of the spat between the deployed position and the retracted position, and a line along an axis of the movement shaft member is the clutch axis, and a direction from the front end of the vehicle toward a rear end of the vehicle is a rear side, the vehicle spat device is configured in such a way that the movement shaft member can rotate around the rotation axis, on the rear side of the rotation shaft member, and, when the spat is at the retracted position, the movement shaft member is arranged at a position on the rear side of and a vertically upper side of the rotation shaft member.

2. The vehicle spat device according to claim 1, further comprising:

a base to which the spat is fixed, wherein the movement shaft member and the base are coupled to each other.

3. The vehicle spat device according to claim 1, wherein the link mechanism has a stepped structure including a wide portion and a narrow portion whose length in a width direction of the vehicle is shorter than that of the wide portion.

4. The vehicle spat device according to claim 2, wherein the link mechanism has a stepped structure including a wide portion and a narrow portion whose length in a width direction of the vehicle is shorter than that of the wide portion.

* * * * *